(12) United States Patent
Sundquist et al.

(10) Patent No.: US 11,597,171 B2
(45) Date of Patent: Mar. 7, 2023

(54) PYROMETER CONTROL FOR HOT DRAPE FORMERS

(71) Applicant: The Boeing Company, Chicago, IL (US)

(72) Inventors: David J. Sundquist, O'Fallon, MO (US); Trevor L. Howard, St. Louis, MO (US); Sarah Vaselaney, St. Louis, MO (US); Robert A. Rapp, Chesterfield, MO (US); Joshua K. Hillam, St. Peters, MO (US)

(73) Assignee: The Boeing Company, Arlington, VA (US)

( * ) Notice: Subject to any disclaimer, the term of this patent is extended or adjusted under 35 U.S.C. 154(b) by 198 days.

(21) Appl. No.: 17/143,044

(22) Filed: Jan. 6, 2021

(65) Prior Publication Data

US 2021/0146598 A1     May 20, 2021

Related U.S. Application Data

(62) Division of application No. 15/788,508, filed on Oct. 19, 2017, now Pat. No. 10,913,198.

(51) Int. Cl.
| | | |
|---|---|---|
| B29C 70/54 | (2006.01) | |
| B29C 35/02 | (2006.01) | |
| B29C 51/46 | (2006.01) | |
| B29C 51/28 | (2006.01) | |
| B29C 51/42 | (2006.01) | |
| B29C 51/20 | (2006.01) | |
| B29C 33/40 | (2006.01) | |
| B29C 70/30 | (2006.01) | |
| B30B 5/02 | (2006.01) | |
| B29C 70/44 | (2006.01) | |

(52) U.S. Cl.
CPC .......... *B29C 70/544* (2021.05); *B29C 33/405* (2013.01); *B29C 35/0288* (2013.01); *B29C 51/20* (2013.01); *B29C 51/28* (2013.01); *B29C 51/42* (2013.01); *B29C 51/46* (2013.01); *B29C 70/30* (2013.01); *B29C 70/44* (2013.01); *B30B 5/02* (2013.01)

(58) Field of Classification Search
CPC ................ B29C 35/0288; B29C 43/12; B29C 2043/5816; B29C 2043/522; B29C 51/46
See application file for complete search history.

(56) References Cited

U.S. PATENT DOCUMENTS

| | | |
|---|---|---|
| 4,462,786 A | 7/1984 | Perryman |
| 4,472,921 A | 9/1984 | Jones |

(Continued)

FOREIGN PATENT DOCUMENTS

| | | |
|---|---|---|
| JP | 2010179618 | 8/2010 |
| JP | 2014500164 | 1/2014 |

OTHER PUBLICATIONS

Office Action for Japanese Patent Application No. 2018-130508 dated Mar. 29, 2022.

(Continued)

*Primary Examiner* — Benjamin A Schiffman
(74) *Attorney, Agent, or Firm* — Kunzler Bean & Adamson

(57) ABSTRACT

An apparatus for hot drape forming a part includes a plurality of pyrometers, a bladder covering a formable material, and a pyrometer control medium positioned between the plurality of pyrometers and the formable material. The plurality of pyrometers are configured to measure a temperature of the pyrometer control medium.

20 Claims, 5 Drawing Sheets

(56) References Cited

U.S. PATENT DOCUMENTS

| | | |
|---|---|---|
| 4,832,885 A | 5/1989 | Gross |
| 4,877,564 A | 10/1989 | Gross |
| 4,897,230 A | 1/1990 | Gross |
| 5,201,981 A | 4/1993 | Whtieside |
| 5,423,669 A | 6/1995 | Chapma |
| 6,517,649 B1 | 2/2003 | Rugg et al. |
| 7,317,175 B2 | 1/2008 | Irwin et al. |
| 10,315,353 B1 | 6/2019 | Culp et al. |
| 2004/0265409 A1 | 12/2004 | Keely |
| 2006/0076701 A1 | 4/2006 | Matzenmuller et al. |
| 2007/0029026 A1 | 2/2007 | Bolognese |
| 2007/0262071 A1 | 11/2007 | Matzenmuller et al. |
| 2009/0267264 A1 | 10/2009 | Tranter et al. |
| 2010/0163155 A1 | 7/2010 | Suzuki |
| 2011/0108667 A1 | 5/2011 | Keller et al. |
| 2011/0250381 A1 | 10/2011 | Nyman et al. |
| 2011/0262572 A1 | 10/2011 | Fricke et al. |
| 2012/0114973 A1 | 5/2012 | Jacobsen et al. |
| 2012/0261847 A1 | 10/2012 | Sirovskiy et al. |
| 2013/0270747 A1 | 10/2013 | Tranter et al. |
| 2017/0136661 A1 | 5/2017 | Shome et al. |
| 2017/0210040 A1 | 7/2017 | Sundquist et al. |
| 2017/0210054 A1 | 7/2017 | Deck et al. |
| 2018/0194040 A1 | 7/2018 | Barnes et al. |
| 2018/0201771 A1 | 7/2018 | Lodefier et al. |
| 2018/0207853 A1 | 7/2018 | Drexler |
| 2018/0281269 A1 | 10/2018 | Sundquist et al. |

OTHER PUBLICATIONS

Extended European Search Report concerning European Patent Application No. 18183614.9 dated Feb. 19, 2019.
Office Action for Japanese Patent Application No. 2018-130508 dated Jul. 13, 2022.

PYROMETER CONTROL FOR HOT DRAPE FORMERS

FIELD

This disclosure relates generally to hot drape forming processes, and more particularly to temperature control for hot drape forming processes.

BACKGROUND

Hot drape forming (HDF) allows composite materials of parts to be formed into curved or contoured shapes. In the context of composite materials, HDF includes heating a composite material and urging the heated composite material against a curved or contoured forming tool. Non-uniform heating of the composite material during HDF, often caused by inaccurate temperatures readings of the composite material, may lead to undesired deformation or inconsistencies in the part. With current HDF techniques, accurately monitoring the temperatures of composite materials so as to promote uniform heating of the composite materials can be difficult.

SUMMARY

The subject matter of the present application has been developed in response to the present state of the art, and in particular, in response to the problems and disadvantages associated with conventional hot drape forming processes that have not yet been fully solved by currently available techniques. Accordingly, the subject matter of the present application has been developed to provide embodiments of a system, an apparatus, and a method that overcome at least some of the above-discussed shortcomings of prior art techniques. For example, according to one implementation, a hot drape forming process is disclosed, which facilitates consistent temperature readings throughout a part.

Disclosed herein is an apparatus for hot drape forming a part. The apparatus includes a plurality of pyrometers, a bladder covering a formable material, and a pyrometer control medium positioned between the plurality of pyrometers and the formable material. The plurality of pyrometers are configured to measure a temperature of the pyrometer control medium. The preceding subject matter of this paragraph characterizes example 1 of the present disclosure.

The pyrometer control medium is between the bladder and the plurality of pyrometers. The preceding subject matter of this paragraph characterizes example 2 of the present disclosure, wherein example 2 also includes the subject matter according to example 1, above.

The pyrometer control medium is a surface treatment applied onto the bladder. The preceding subject matter of this paragraph characterizes example 3 of the present disclosure, wherein example 3 also includes the subject matter according to example 2, above.

The pyrometer control medium rests on the bladder. The preceding subject matter of this paragraph characterizes example 4 of the present disclosure, wherein example 4 also includes the subject matter according to example 2, above.

The pyrometer control medium is integrated into the bladder. The preceding subject matter of this paragraph characterizes example 5 of the present disclosure, wherein example 5 also includes the subject matter according to example 2, above.

The pyrometer control medium has a surface roughness of greater than twenty microns. The preceding subject matter of this paragraph characterizes example 6 of the present disclosure, wherein example 6 also includes the subject matter according to any one of examples 1-5, above.

The pyrometer control medium has a gloss of less than four gloss units. The preceding subject matter of this paragraph characterizes example 7 of the present disclosure, wherein example 7 also includes the subject matter according to any one of examples 1-6, above.

The pyrometer control medium includes a polyester mat. The preceding subject matter of this paragraph characterizes example 8 of the present disclosure, wherein example 8 also includes the subject matter according to example 7, above.

The pyrometer control medium includes a black matted material. The preceding subject matter of this paragraph characterizes example 9 of the present disclosure, wherein example 9 also includes the subject matter according to any one of examples 1-8, above.

The pyrometer control medium includes a plurality of spaced apart patches. Each one of the plurality of spaced apart patches is placed directly below a respective one of the plurality of pyrometers. The preceding subject matter of this paragraph characterizes example 10 of the present disclosure, wherein example 10 also includes the subject matter according to any one of examples 1-9, above.

The thickness of the pyrometer control medium is less than one-fifth of an inch. The preceding subject matter of this paragraph characterizes example 11 of the present disclosure, wherein example 11 also includes the subject matter according to any one of examples 1-10, above.

The pyrometer control medium includes a felt material. The preceding subject matter of this paragraph characterizes example 12 of the present disclosure, wherein example 12 also includes the subject matter according to any one of examples 1-11, above.

The pyrometer control medium includes a latex material. The preceding subject matter of this paragraph characterizes example 13 of the present disclosure, wherein example 13 also includes the subject matter according to any one of examples 1-12, above.

The pyrometer control medium has a uniform thickness. The preceding subject matter of this paragraph characterizes example 14 of the present disclosure, wherein example 14 also includes the subject matter according to any one of examples 1-13, above.

Also disclosed herein is a hot drape forming system. The system includes an apparatus including a plurality of pyrometers, a bladder covering a formable material, and a pyrometer control medium positioned between the plurality of pyrometers and the formable material. The plurality of pyrometers are configured to measure a temperature of the pyrometer control medium. The system further includes a plurality of heat sources and a controller, configured to control the plurality of heat sources based on temperature readings of the plurality of pyrometers. The preceding subject matter of this paragraph characterizes example 15 of the present disclosure.

The plurality of heat sources are divided into zones. Each one of the plurality of pyrometers corresponds to one of the zones and the controller is configured to turn each zone on and off based on a corresponding one of the plurality of pyrometers. The preceding subject matter of this paragraph characterizes example 16 of the present disclosure, wherein example 16 also includes the subject matter according to example 15, above.

The controller is configured to predict a temperature of the formable material based on the temperature of the pyrometer control medium. The preceding subject matter of this paragraph characterizes example 17 of the present disclosure, wherein example 17 also includes the subject matter according to any one of examples 15 or 16, above.

Additionally disclosed herein is a method of controlling a hot drape former. The method includes positioning a pyrometer control medium between a plurality of pyrometers and a bladder covering a formable material. The method also includes measuring a temperature of the pyrometer control medium with the plurality of pyrometers. The method further includes predicting a temperature of the formable material based on the temperature of the pyrometer control medium. The preceding subject matter of this paragraph characterizes example 18 of the present disclosure.

Positioning the pyrometer control medium between the plurality of pyrometers and the bladder covering the formable material includes positioning a matted material between the bladder and the plurality of pyrometers. The preceding subject matter of this paragraph characterizes example 19 of the present disclosure, wherein example 19 also includes the subject matter according to example 18, above.

Positioning the pyrometer control medium between the plurality of pyrometers and a bladder covering the formable material includes applying the pyrometer control medium onto the bladder as a surface treatment. The preceding subject matter of this paragraph characterizes example 20 of the present disclosure, wherein example 20 also includes the subject matter according to any one of examples 19 or 20, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
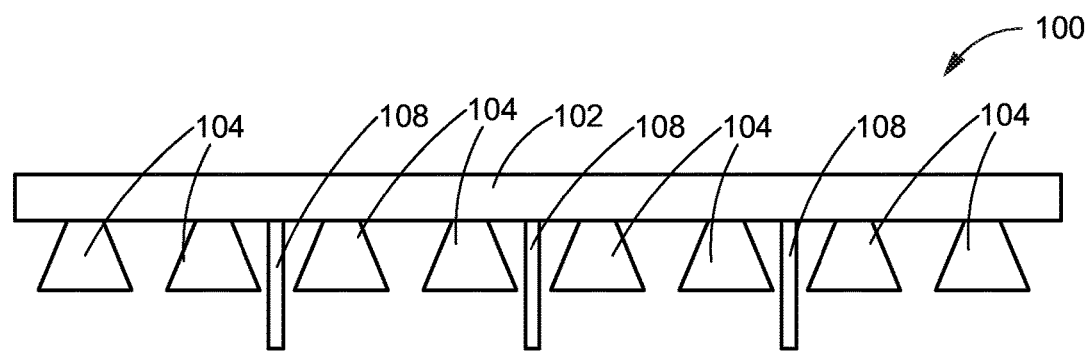
FIG. 1 is a side elevation view of an apparatus for hot drape forming a part, according to one or more embodiments of the present disclosure.
Figure 1:
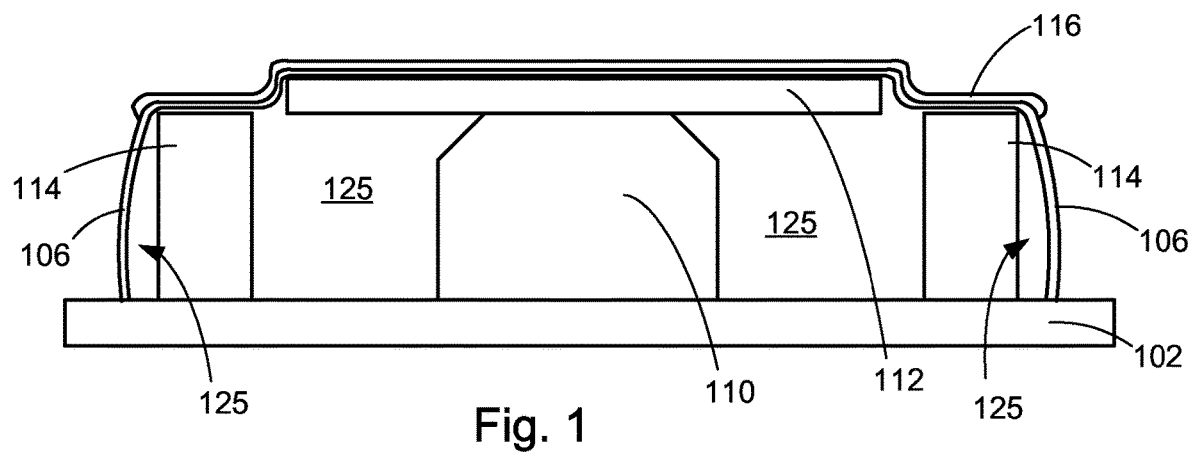

Referring to FIG. 1, one embodiment of an apparatus 100 for hot drape forming (HDF) a part is shown. The apparatus 100 is used implement an HDF process. As will be described in more detail below, the apparatus 100 includes a temperature control system, which promotes accurate and more uniform temperature control throughout the apparatus 100.

The apparatus 100 includes a frame 102 and a plurality of heat sources 104. The frame 102 is a structure or casing that houses, supports, or underpins the various components of the apparatus 100 and the elements utilized with the apparatus 100. The frame 102 has upper and lower portions which move relative to each other and may form an enclosable interior space. The plurality of heat sources 104 are attached to the frame 102. The plurality of heat sources 104 may be any of various types of heat sources including, but not limited to, heat lamps, heat coils, heat elements, etc. The plurality of heat sources 104 may also be attached at various locations within or external to the apparatus 100, including to the frame 102, above the frame 102, or below the frame 102. In some embodiments, the plurality of heat sources 104 are co-movably coupled to the frame 102. In some embodiments, the heat sources 104 are not attached to the frame 102 but are positioned to heat the interior space.

The apparatus 100 is configured to form a formable material 112 into a part. The formable material 112 is a sheet of material made of a single material or a plurality of materials that are formable when heated including composite materials. The formable material may be, without limitation, a laminate or a laminate charge including a carbon fiber reinforced plastic (CFRP) or polymer-matrix composites. The plurality of heat sources 104 are configured to heat the formable material 112, which is positioned within the apparatus 100 on top of a male tool 110, which can be mandrel-like.

In an HDF process, after the heat sources 104 heat the formable material 112 to a temperature sufficient to promote deformation of the formable material 112 over the male tool 110, applied force(s) conforms overhanging edges of the formable material 112 onto the male tool 110. In some embodiments, the applied force(s) is caused by a pressure differential to the formable material 112 to form it over the male tool 110. Referring to FIG. 1, a vacuum is created under a bladder 106 (sometimes referred to as a membrane or diaphragm) in cavity 125, which causes a pressure differential within the cavity 125. The pressure differential causes the bladder 106 to apply a force to the formable material 112 which presses the overhanging edges of the formable material 112 onto the male tool 110. The bladder 106 is a flexible, stretchable material such as, without limitation, a silicone.

Also positioned within the apparatus 100 are stand-off blocks 114, which help to reduce the weight and force the bladder 106 applies onto the formable material 112 prior to applying the pressure differential. The stand-off blocks 114 are positioned around a periphery of the male tool 110 to support a portion of the weight of the bladder 106 to prevent forcing the formable material 112 down onto the male tool 110 prior to reaching an appropriate temperature.

Temperature variations along the formable material 112 may lead to non-conformance of formed parts. In contrast, temperature uniformity across the formable material 112 helps to increase optimal properties of a formed part and reduces the need to scrap non-conforming parts. The apparatus 100 utilizes feedback mechanisms, including a temperature control system, to regulate the heating of and temperature uniformity across the formable material 112. The feedback mechanisms operably control the heat sources 104 (e.g., activate and deactivate the heat sources 104, modulate the heat generated by the heat sources 104, etc.) to promote temperature uniformity across the formable material 112.

Embodiments described herein utilize pyrometers 108 to provide feedback. A pyrometer, sometimes referred to as infrared thermometers, is a type of remote-sensing thermometer used to measure the temperature of a surface. Pyrometers determine the temperature of a surface from a distance using a process known as pyrometry or radiometry. Generally, pyrometry or radiometry includes detecting the spectrum of thermal radiation, sometimes called blackbody radiation, the surface emits. The pyrometers 108 are pointed in a direction towards the formable material 112. In the illustrated embodiment, the pyrometers 108 are attached to and positioned in fixed locations along the frame 102. In some embodiments, the pyrometers 108 may be repositionable along the frame 102 to adjust the location of the pyrometers 108 relative to the formable material 112. For example, the pyrometers 108 may be slidable in slots formed in the frame 102 and releasably tightenable in desired locations within the slots to temporarily prevent relative movement of the pyrometers 108 and the frame 102. In some implementations, the location of the pyrometers 108 is adjustable based on the size and/or shape of the part to be formed.

The pyrometers 108 are positioned to sense the temperature of the formable material 112. However, as shown in FIG. 1, some solid features, such as the bladder 106, may be interposed between the pyrometers 108 and the formable material 112. Accordingly, the pyrometers 108 do not directly sense the temperature of the formable material 112, but rather indirectly sense the temperature of the formable material 112 based on directly sensing the temperature of the solid features between the pyrometers 108 and the formable material 112. In other words, the temperature of the formable material 112 is predicted based on temperature readings of an intermediate surface. Accurate readings of the intermediate surface promote accurate predictions or indirect readings of the temperature of the formable material 112. To promote accurate predictions of the temperature of the formable material 112, the apparatus 100 includes a pyrometer control medium 116 positioned below the plurality of pyrometers 108 and above the bladder 106 and formable material 112. The pyrometer control medium 116 is configured to promote more accurate temperature readings by the pyrometers 108, which leads to more accurate predictions of the temperature of the formable material 112.

As presented above, the pyrometers 108 are configured to measure or remote sense a temperature of the pyrometer control medium 116. The pyrometer control medium 116 may be a covering or sheet positioned over and resting on the bladder 106, may be separate from the bladder 106 or attached to the bladder 106, may be a surface treatment applied onto the bladder 106, or may be part of the bladder 106.

In those embodiments where the pyrometer control medium 116 is a covering or sheet positioned over and resting on the bladder 106, the pyrometer control medium 116, can be a thin sheet of material of uniform thickness or substantially uniform thickness (e.g., a thickness within a tolerance of the surface roughness of the material). The sheet of material is of a size that enables the pyrometer control medium 116 to span across and cover the bladder 106. In some implementations, the pyrometer control medium 116 is not a uniform thickness.

In some embodiments, the pyrometer control medium 116 may be separate from the bladder 106. The pyrometer control medium 116 is not connected or attached to the bladder 106 in any manner. The contact between the pyrometer control medium 116 and the bladder 106 allows for heat transfer to occur and for accurate temperature readings while not inhibiting or affecting the movement of the bladder 106 once the pressure differential is applied as the pyrometer control medium may move relative to the bladder 106.

In some embodiments, the pyrometer control medium 116 is attached to the bladder 106. In such embodiments, the pyrometer control medium 116 may be more secure and also ensures placement of the pyrometer control medium 116 is consistent or repeatable from part to part. For example, the pyrometer control medium 116 may be adhered to the bladder 106 by an adhesive material, or stitched or sewn to the bladder 106, or otherwise attached. The pyrometer control medium 116 may be co-movably attached.

In some embodiments, the pyrometer control medium 116 is not separate from the bladder 106 but is applied as a surface treatment to the bladder 106. For example, the pyrometer control medium 116 may be painted directly on the bladder 106. The painted on pyrometer control medium 116 allows for more accurate readings of the pyrometers without the need of a separate sheet of material. In other implementations, the pyrometer control medium 116 may be other surface treatment applications that are applied to the bladder 106.

In some embodiments, the pyrometer control medium 116 may be part of the bladder 106. Instead of applying the pyrometer control medium 116 to the bladder 106 as a surface treatment, the formation or manufacturing of the bladder 106 may include the pyrometer control medium 116. For example, the pyrometer control medium 116 may be integrated into the bladder 106 or co-formed with the bladder 106. In some implementations, the bladder 106 may be made of a material with the same color, texture, and/or surface characteristics as those described herein and function as the pyrometer control medium 116.

Figure 2:
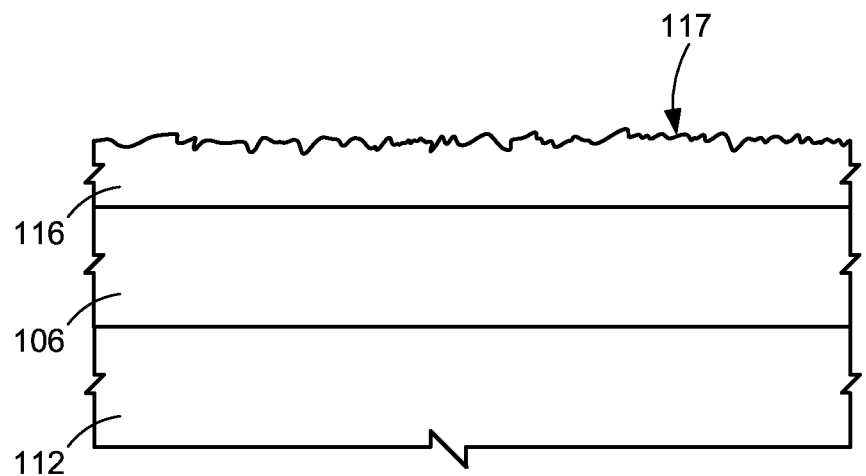
FIG. 2 is a side elevation view of a detail of a bladder and a pyrometer control medium of the apparatus of FIG. 1, according to one or more embodiments of the present disclosure.

Referring to FIG. 2, a detailed view of the pyrometer control medium 116 and the bladder 106 is shown. The pyrometer control medium 116 includes a surface 117 which is configured to be exposed to the plurality of pyrometers 108. The surface may be rough. In some embodiments, the surface roughness is greater than twenty microns. In some embodiments, the surface roughness is greater than three hundred and fifty microns. In some embodiments, the surface roughness is greater than four hundred microns. The surface roughness may be dependent upon the type of material utilized for the pyrometer control medium 116. In some embodiments, the pyrometer control medium 116 is a matted material.

To enhance accurate temperature sensing, the pyrometer control medium 116 is made of a material with a color that is relatively dark. In some embodiments, the pyrometer control medium 116 is black. In some embodiments, the pyrometer control medium 116 is gray. The pyrometer control medium 116 may be other dark colors or shades including green, brown, blue, or purple. The darkness in color and/or brightness may also be dependent upon the type of material utilized for the pyrometer control medium 116. In some embodiments, the pyrometer control medium 116 includes a lightness of less than 30 L* as measured in a CIELAB color space or lab color space.

The pyrometer control medium 116 may be made of any of various materials that are sufficiently dark and provide an acceptable texture. The pyrometer control medium 116 may be rubber, felt, latex, polyester, silicon, aluminum foil, and/or other like materials.

To enhance accurate temperature sensing, the pyrometer control medium 116 may be below a particular level of gloss. In some embodiments, the pyrometer control medium 116 includes a gloss of less than four gloss units. In some embodiments, the pyrometer control medium includes a gloss of less than ten gloss units. Gloss may be measured by use of a gloss meter which measures the specular reflection gloss of a surface.

To enhance accurate temperature sensing and also allow for heating of the formable material 112, the pyrometer control medium 116 may be configured to be a thickness which allows for efficient heat transfer. In some embodiments, the pyrometer control medium 116 may be a uniform thickness across the bladder 106. In some embodiments, the pyrometer control medium 116 includes a thickness of not greater than one-fifth of an inch. In some embodiments, the pyrometer control medium 116 includes a thickness of not greater than one inch. In some embodiments, the pyrometer control medium 116 includes a thickness of not greater than one-twentieth of an inch. The thickness of the pyrometer control medium 116 may also be dependent upon the type of material utilized for the pyrometer control medium 116. Materials that more efficiently transfer heat may generally be thicker than materials that are less efficient at heat transfer.

The pyrometer control medium 116 may contact the bladder 106. Contact between the pyrometer control medium 116 and the bladder 106 may allow for more even heat transfer distribution between the pyrometer control medium 116 and the bladder 106 and for more accurate relationship between the temperature of the pyrometer control medium 116 and the bladder 106. The same principle may be applied between the bladder 106 and the formable material 112. Contact between the bladder 106 and the formable material 112 may allow for more even heat transfer distribution between the bladder 106 and the formable material 112 and more accurate relationship between the temperature of the bladder 106 and the formable material 112.

The positioning of the pyrometers 108 may also lead to different temperature readings. As the center of the formable material 112 rests on the male tool 110, the center of the formable material 112 may heat more slowly than the exterior edges of the formable material which hang out over male tool 110. A single reading at the center of the formable material 112 may result in a lower temperature reading and relying on only the reading at the center of the formable material 112 may result in overshoot of temperature on the exterior edges of the formable material 112, which hang out over male tool 110.

Figure 3:
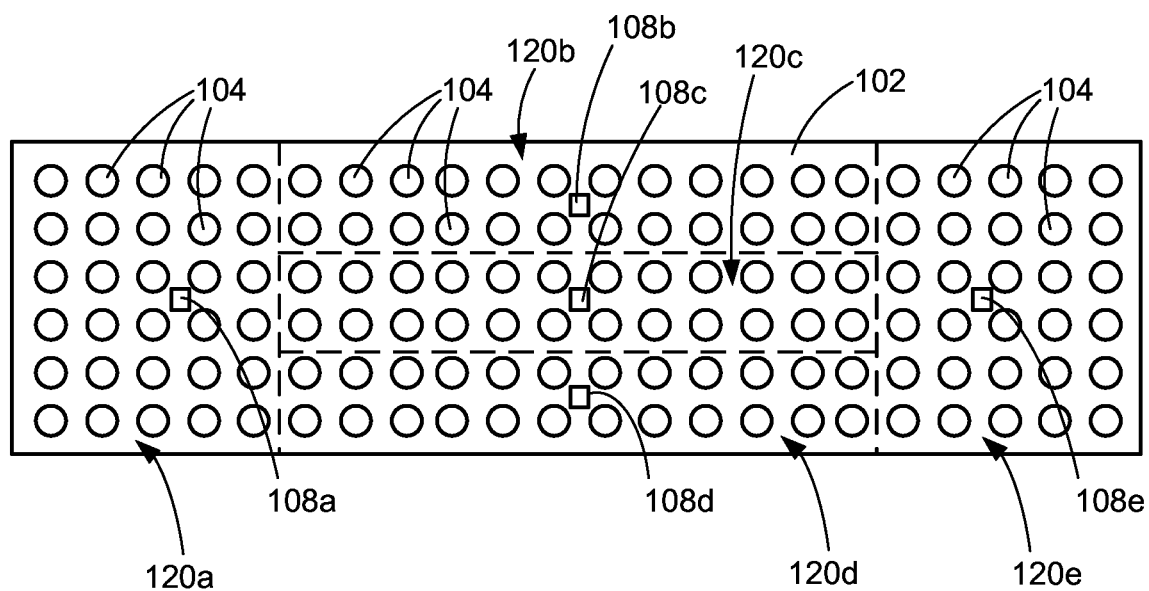
FIG. 3 is a top plan view of heat sources and pyrometers of an apparatus for hot drape forming a part, according to one or more embodiments of the present disclosure.

As shown in FIG. 3, to combat the heating variances between various parts of the formable material, the heat source 104 may be divided into heating zones 120*a*-120*e*. As depicted, a grid of heat sources 104 in a predetermined pattern are attached to the frame 102. The operation of the heat sources 104 may be controlled individually and/or by heating zone. In the illustrated embodiment, the heat sources 104 are divided into 5 separate heating zones 120*a*-120*e*. Each heating zone may be independently controlled and operated relative to the other heating zones. For example, heat sources 104 in heating zones 120*b*, 120*c*, and 120*d* may continue to produce heat while the heat sources 104 in heating zones 120*a* and 120*e* are turned off.

The independent heating zones 120*a*-120*e* may be controlled (e.g., activated (turned on), deactivated (turned off), and adjusted) based on the independent readings of the pyrometers 108*a*-108*e*. The individual pyrometers 108*a*-108*e* may each provide independent readings to allow for control of when to turn on and off the heat sources 104 of their corresponding heating zones 120*a*-120*e*. For example, the operation of the heat sources 104 of heating zone 120*a* may be dependent on the readings gathered by pyrometer 108*a*, while the heat sources 104 of heating zone 120*b* may be dependent on the readings gathered by pyrometer 108*b*, and so on.

In the illustrated embodiment, the heating zones 120*a*-120*e* each has a single corresponding pyrometer 108*a*-108*e*. In some embodiments, the heating zones 120*a*-120*e* may include more than one pyrometer 108. In such cases, the operation of the heat sources 104 in a particular heating zone 120*a*-120*e* may be dependent on an average or blending of the multiple readings from pyrometers 108 in the particular heating zone 120*a*-120*e*.

In some embodiments, the heating zones 120*a*-120*e* may be adjustable depending on the size and shape of the formable material 112 to be formed and/or the size and shape of the male tool 110. In addition, the pyrometers 108*a*-108*e* may be activated/deactivated or acknowledged/ignored based on the heating zones 120*a*-120*e* selected. For example, in some embodiment, an apparatus 100 may include a plurality of pyrometers 108 which are in fixed locations within the apparatus 100. Depending on the size and shape of the formable material 112 to be formed and/or the size and shape of the male tool 110, certain pyrometers 108 may be turned off or the readings may be ignored during the operation of the apparatus.

Figure 4:
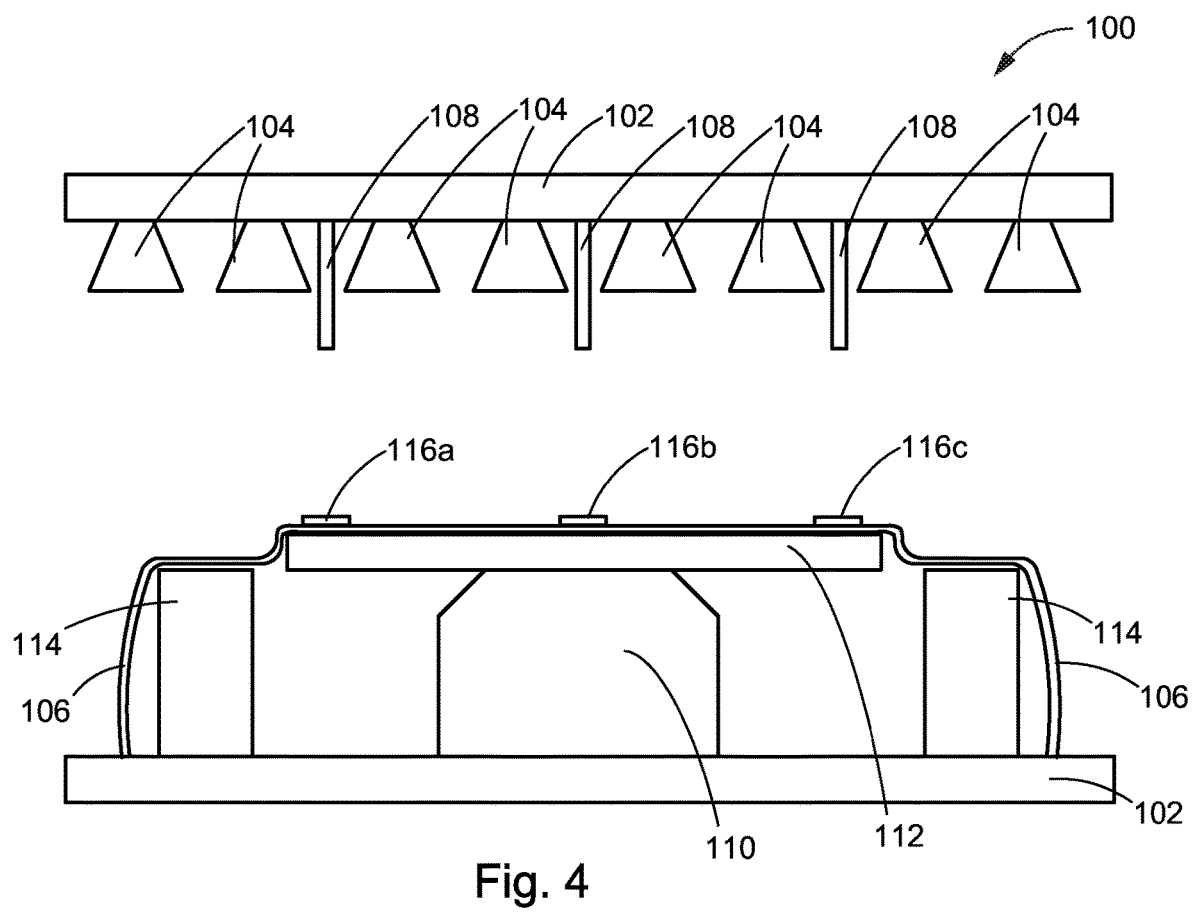
FIG. 4 is a side elevation view of an apparatus for hot drape forming a part, according to one or more embodiments of the present disclosure.

The pyrometer control medium 116 may cover the entirety of the bladder 106. In some embodiments, the pyrometer control medium 116 does not cover the entirety of the bladder 106. Referring to FIG. 4, the pyrometer control medium 116 is a plurality of patches 116a, 116b, and 116c. In the illustrated embodiment, the patches 116a, 116b, and 116c are placed directly below the pyrometers 108. In some embodiments, the pyrometers 108 are configured to point at the patches 116a, 116b, and 116c. This allows the pyrometers 108 to remote sense the temperature at the patches 116a, 116b, and 116c instead of the bladder 106 which may render inaccurate temperature readings.

Figure 5:
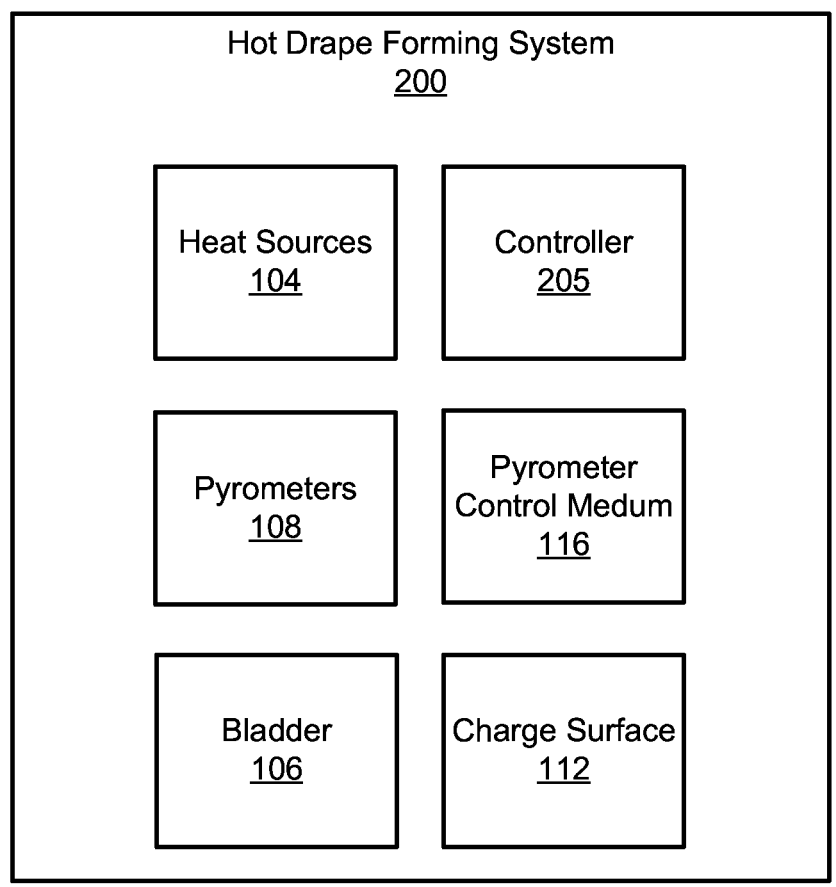
FIG. 5 is a block diagram of a hot drape forming system, according to one or more embodiments of the present disclosure.

Referring now to FIG. 5, a block diagram of a hot drape forming system 200 is shown. The system 200 allows for control and operation of the various embodiments of the apparatus 100 described herein. The system may include various components, not illustrated, to allow for control of the apparatus described herein, such as, but not limited to, processors, memory, computer hardware and software, and modules. The system 200 includes various components including the components described in conjunction with the embodiments of the apparatus 100 described herein.

The illustrated block diagram includes the heat sources 104, the pyrometers 108, the bladder 106, the formable material 112, and the pyrometer control medium 116. The hot drape forming system 200 further includes a controller 205 which allows for controlling the apparatus 100 and the various components of the apparatus 100 and system 200.

The controller 205 may be configured to control operation of the heat sources 104, the pyrometers 108, and the heating zones 120a-120e as was described above in conjunction with FIGS. 1-4. With the pyrometers 108 fixed in position in the apparatus 100 and the ability to control the heat sources 104, the pyrometers 108, and the heating zones 120a-120e through the controller 205, set up labor and time for forming of parts may be significantly reduced. Individual heat sensors need not be placed with each new part or differently sized part as is done with conventional thermocouples utilized in hot drape formers. The pyrometers 108 are fixed and can be activated/deactivated or acknowledged/ignored based on inputs to the controller 205.

Figure 6:
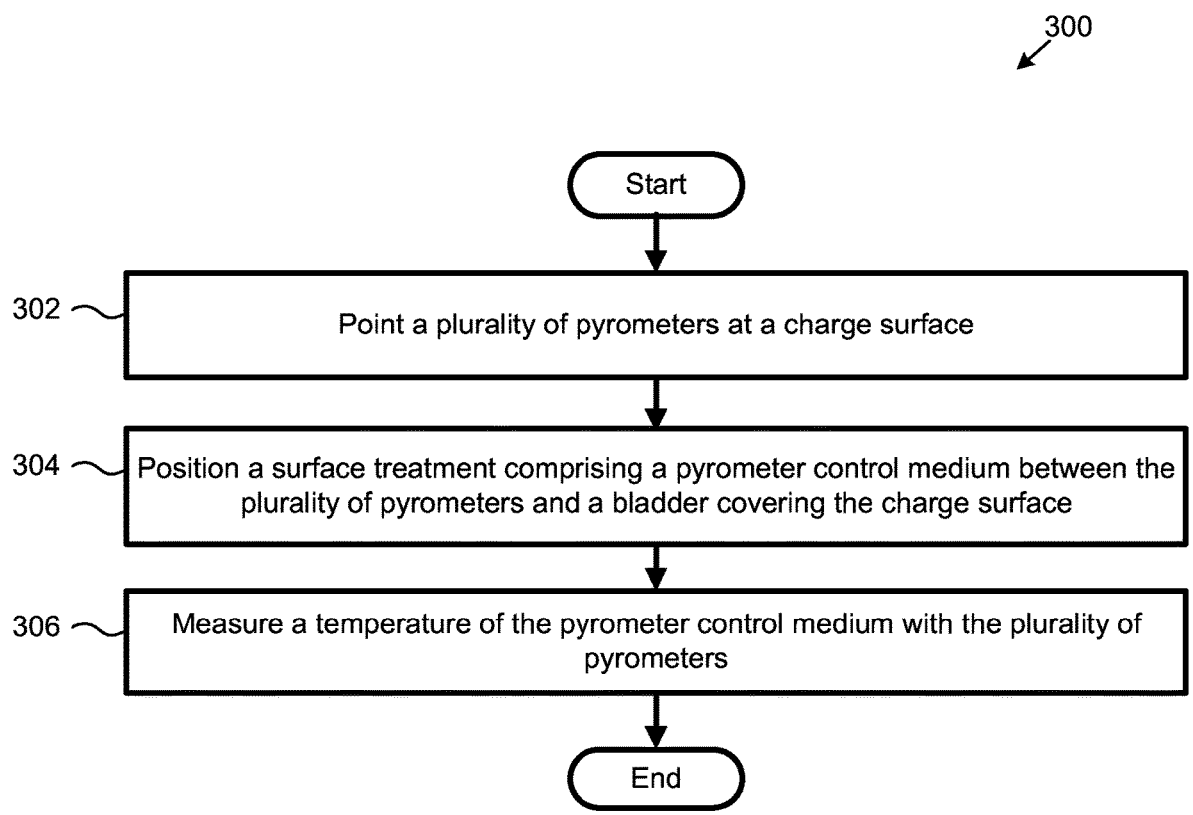
FIG. 6 is a schematic flow diagram of a method of hot drape forming a part, according to one or more embodiments of the present disclosure.

Now referring to FIG. 6, one embodiment of a method 300 of controlling a hot drape former is shown. The method 300 includes pointing a plurality of pyrometers at a formable material at 302 and positioning a pyrometer control medium between the plurality of pyrometers and a bladder covering the formable material at 304. At 306, the method 300 includes measuring a temperature of the pyrometer control medium with the plurality of pyrometers. The method then ends.

In some embodiments, positioning the pyrometer control medium between the plurality of pyrometers and the bladder covering the formable material includes positioning a matted material above the bladder. In some embodiments, positioning the pyrometer control medium between the plurality of pyrometers and the bladder covering the formable material includes applying the pyrometer control medium onto the bladder as a surface treatment.

Although described in a depicted order, the method of controlling a hot drape former may proceed in any of a number of ordered combinations. As example, the pyrometer may be positioned prior to or after pointing the plurality of pyrometers at the formable material.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of controlling a hot drape former, the method comprising:
   positioning a pyrometer control medium between a plurality of pyrometers and a bladder covering a formable material;
   measuring a temperature of the pyrometer control medium with the plurality of pyrometers; and
   predicting a temperature of the formable material based on the temperature of the pyrometer control medium,
   wherein positioning the pyrometer control medium between the plurality of pyrometers and the bladder comprises attaching the pyrometer control medium to the bladder.

2. The method according to claim 1, wherein attaching the pyrometer control medium to the bladder comprises attaching a matted material to the bladder.

3. The method according to claim 1, wherein attaching the pyrometer control medium to the bladder comprises applying the pyrometer control medium onto the bladder as a surface treatment.

4. The method according to claim 1, further comprising:
   heating the pyrometer control medium and the formable material with a plurality of heat sources that are divided into zones, wherein at least one of the plurality of pyrometers corresponds to each one of the zones; and
   turning one or more heat sources of the plurality of heat sources associated with each zone on or off based on temperature feedback from the at least one pyrometer of the plurality of pyrometers corresponding with the zone.

5. The method according to claim 4, wherein turning the one or more heat sources of the plurality of heat sources associated with each zone on or off is based on temperature feedback from more than one pyrometer of the plurality of pyrometers corresponding with the zone.

6. The method according to claim 4, wherein heating the pyrometer control medium and the formable material with a plurality of heat sources comprises individually controlling the one or more heat sources associated with one of the zones relative to the one or more heat sources associated with another of the zones.

7. The method according to claim 4, further comprising adjusting a quantity of the heat sources forming at least one of the zones based on a size or shape of the formable material.

8. The method according to claim 1, wherein attaching the pyrometer control medium to the bladder comprises attaching a plurality of spaced apart patches to the bladder.

9. The method according to claim 8, wherein attaching the plurality of spaced apart patches to the bladder comprises placing each one of the plurality of spaced part patches directly below a respective one of the plurality of pyrometers.

10. The method according to claim 1, wherein attaching the pyrometer control medium to the bladder comprises co-movably attaching the pyrometer control medium to the bladder.

11. The method according to claim 1, wherein attaching the pyrometer control medium to the bladder comprises adhering the pyrometer control medium to the bladder.

12. The method according to claim 1, wherein attaching the pyrometer control medium to the bladder comprises stitching the pyrometer control medium to the bladder.

13. The method according to claim 1, wherein attaching the pyrometer control medium to the bladder comprises positioning the pyrometer control medium in direct contact with the bladder.

14. The method according to claim 13, wherein directly contacting the bladder with the pyrometer control medium comprises directly contacting the bladder with the pyrometer control medium such that the bladder is movable relative to the pyrometer control medium.

15. A method of controlling a hot drape former, the method comprising:
   positioning a pyrometer control medium between a plurality of pyrometers and a bladder covering a formable material;
   resting the pyrometer control medium on the bladder;
   measuring a temperature of the pyrometer control medium with the plurality of pyrometers; and
   predicting a temperature of the formable material based on the temperature of the pyrometer control medium.

16. The method according to claim 15, further comprising:
   positioning at least one stand-off block adjacent the formable material; and
   resting a portion of the bladder on the at least one stand-off block.

17. A method of controlling a hot drape former, the method comprising:
   positioning a bladder between a plurality of pyrometers and a formable material;
   surface treating the bladder to form a pyrometer control medium between the plurality of pyrometers and the formable material;
   measuring a temperature of the pyrometer control medium with the plurality of pyrometers; and
   predicting a temperature of the formable material based on the temperature of the pyrometer control medium.

18. The method according to claim 17, wherein surface treating the bladder comprises integrating the pyrometer control medium into the bladder.

19. The method according to claim 17, wherein surface treating the bladder comprises painting the pyrometer control medium directly on the bladder.

20. The method according to claim 17, wherein surface treating the bladder comprises applying the pyrometer control medium directly on the bladder.

\* \* \* \* \*